Aug. 13, 1957 E. T. BURTON 2,802,940

MULTIVIBRATOR CIRCUIT

Filed June 26, 1953

INVENTOR
E. T. BURTON
BY [signature]
ATTORNEY

United States Patent Office 2,802,940

Patented Aug. 13, 1957

2,802,940

MULTIVIBRATOR CIRCUIT

Everett T. Burton, Millburn, N. J., assignor to Bell Telephone Laboratories, Incorporated, New York, N. Y., a corporation of New York Application June 26, 1953, Serial No. 364,455

11 Claims. (Cl. 250—27)

Figure 1:
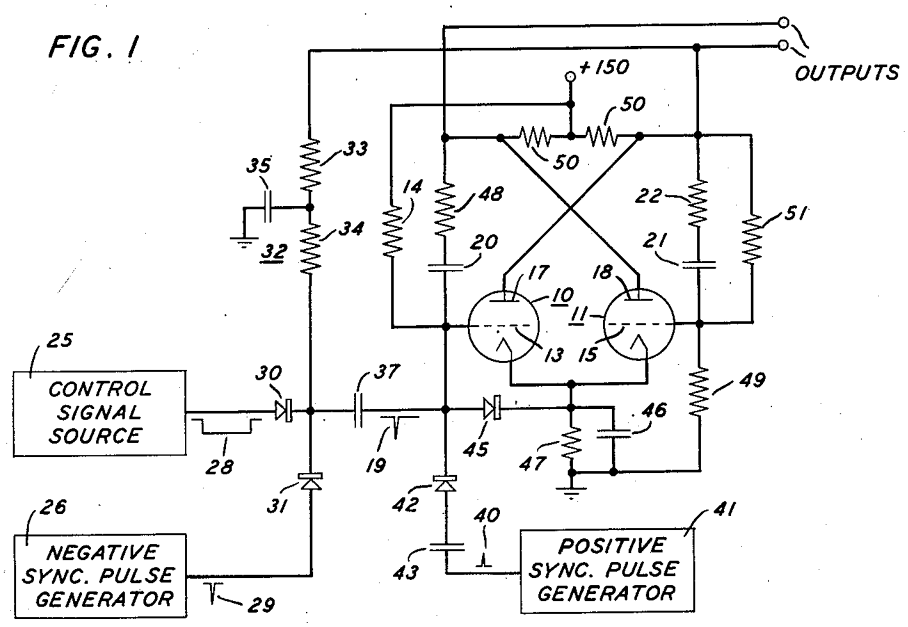

This invention relates to multivibrator circuits and more particularly to such circuits wherein pulses appear on the output of a multivibrator circuit for accurately predetermined periods of time in a number of repeated time sequences.

In some electrical systems, a particular circuit or equipment may be available to any of a number of information sources on a time division basis, each of the sources being assigned a time position or a time slot in a repeated time sequence or system cycle. When any one information source is to utilize a particular common circuit, that circuit is enabled during the time slot of the information source and inhibited or disabled during the other time slots of the system cycle. This condition exists for the repeated cycles during which that circuit is functioning or operating on the particular information from the information source.

One such electrical system is a time separation telephone system of the type disclosed in application Serial No. 364,258, filed June 26, 1953, of E. T. Burton, A. L. Robinson and E. L. Younker. In this system, a plurality of lines and trunks share a common transmission path through a telephone exchange on a time division or time separation basis. When any particular trunk or call is to be serviced, as to receive dialed pulses, apply dial or busy tones, determine that a connection is to be broken and thus to erase the memory information for that connection, etc., circuits common to all the lines and trunks are utilized, but each of these common circuits will be enabled only in a particular time slot and disabled during all the other time slots in the office cycle.

The control of these circuits which have been thus seized by a particular time slot requires a control circuit which, when operated, will provide the enabling pulse to these circuits in the particular time slot and inhibiting or blanking voltages to the circuits in all other time slots of the office cycle. The control circuit should be able to remain indefinitely in a quiescent state when not required to function and be able to operate on application of a voltage pulse in any time slot. In operation, the circuit must then run in synchronism with the office cycle and provide a binary output which continues to respond in step with the time slot which triggered the response, an enabling voltage being provided in this time slot and a blanking voltage in all other time slots. At the termination of a service period, the circuit should be restored to its quiescent state by interrupting the sequence at a fixed point in the response cycle.

It is also important that the circuit be in exact synchronism with the office cycle, thereby preventing both the possible occurrence of an enabling voltage in other than the seized time slot and the possibility of an overlap, in which the enabling voltage is not in exact synchronism with the seized time slot but overlaps both it and a neighboring time slot.

It is a general object of this invention to provide an improved circuit capable of generating an enabling pulse in a particular time slot in a repeated time cycle and a blanking or inhibiting voltage during all other time slots in the time cycle.

It is another object of this invention to provide such a circuit employing but a single multivibrator stage.

It is a further object of this invention to assure that the enabling output appears only in the seized time slot and that no enabling voltages appear during other time slots.

These and other objects of this invention are attained in accordance with one specific embodiment wherein a monostable multivibrator circuit has an initiating pulse applied to it through an input switch which is enabled by certain pulses of a train of synchronizing pulses defining the start of successive time slots. If the office cycle contains $n$ time slots, the parameters of the multivibrator circuit are such that it will tend to restore after $(n-1)$ time slots. Restore exactly at the commencement of the $(n-1)$ time slot is assured by a train of tickling pulses of low amplitude continuously applied to trigger the control electrode of the multivibrator circuit in synchronism with the synchronizing pulses and thus at the start of each time slot.

The input switch has applied to it an inhibiting control from one of the plates of the multivibrator circuit. This inhibiting control will prevent passage of initiating or triggering pulses through the input switch during the $(n-1)$ time slots during which the multivibrator circuit is in its triggered state. On return of the multivibrator circuit to its quiescent state, this inhibiting control is not immediately removed but a delay is introduced, advantageously by a filter circuit, so the inhibition is present at the input switch at the commencement of the $(n-1)$ time slot, at which instant the multivibrator circuit restores, but is not present at the commencement of the next or $n$th time slot, at which instant the multivibrator circuit is again triggered.

A binary output from the multivibrator circuit is thus attained, the output being a voltage of one polarity during the $(n-1)$ time slot and of another polarity during all other time slots.

In order to enable the multivibrator circuit to restore in a single time slot, the timing condenser of the multivibrator circuit is connected so as to discharge through a diode and a by-pass capacitor in parallel with the cathode resistance. The charge on the timing condenser at the time of the restore of the multivibrator circuit, which charge represents almost the entire voltage difference between the voltages on the conducting and nonconducting plates of the multivibrator, is thus removed during a single time slot.

It is a feature of this invention that initiating pulses for a monostable multivibrator circuit be transmitted by a gate circuit which is inhibited during the period the multivibrator circuit is in its triggered state by a feedback path from one plate of the multivibrator circuit.

It is a further feature of this invention that the synchronizing pulses each defining the commencement of a time slot in a repeated office cycle of $n$ time slots be applied to the input gate circuit and that the inhibiting signal from the feedback path be present at the gate for a period greater than $(n-1)$ time slots but less than the full office cycle of $n$ time slots.

It is a still further feature of this invention that the multivibrator circuit, after triggering, restore precisely at the commencement of the seized office cycle but that the effect of this restore be delayed in the feedback path providing the inhibition to the input gate so that the inhibition is present coincident with the syncronizing pulse defining the instant of restore of the multivibrator circuit but is not present at the start of the next time slot, More specifically it is a feature of a specific embodiment of this invention that the delay be provided by a low-pass filter network.

It is a still further feature of this invention that tickling pulses of low amplitude be applied to the timing condenser of the multivibrator circuit in synchronism with the synchronizing pulses to assure that the multivibrator restores precisely at the commencement of a time slot and that the charge on this condenser be quickly restored within a single time slot to substantially what it is during the quiescent state of the multivibrator.

Figure 2:
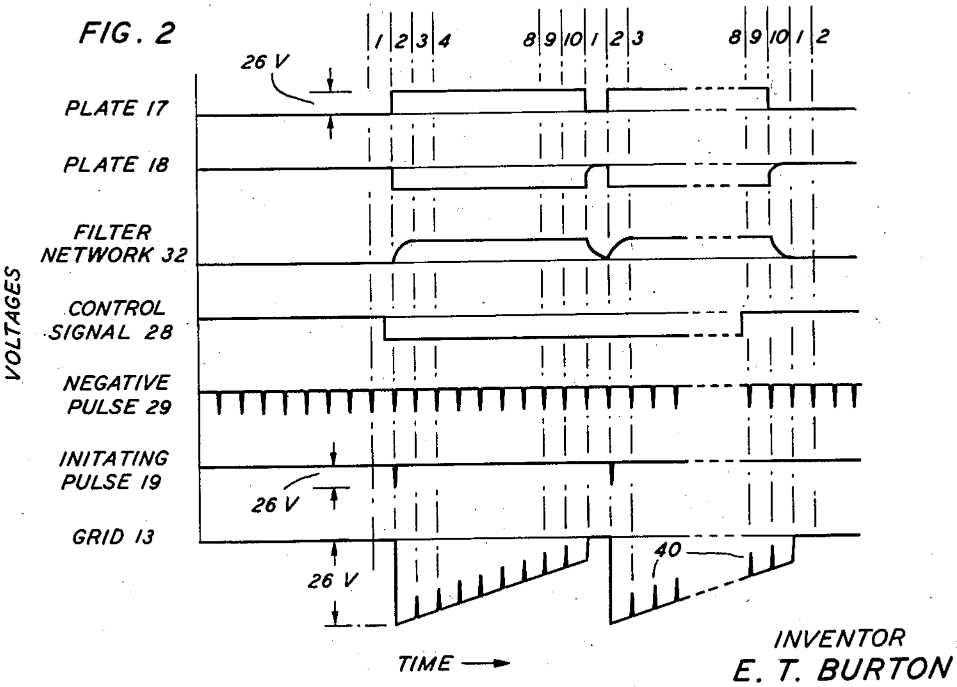

A complete understanding of this invention and of these and other desirable features thereof may be gained from consideration of the following detailed description and the accompanying drawing, in which:

Fig. 1 is a schematic representation of a multivibrator circuit in accordance with one specific illustrative embodiment of this invention; and Fig. 2 is a time plot of voltages at various points in the circuit of Fig. 1 during operation of the circuit.

Turning now to the drawing, one specific illustrative embodiment of this invention is depicted in Fig. 1. In order to describe this circuit with reference to one type of function that it can attain, it will be assumed that the circuit is to be utilized in a time separation telephone system in which a number of separate channels are connected through a single common path by the principle of time sharing. Each connection is repeatedly established on a pulse basis at a rate high enough in frequency that the successive speech samples so transmitted combine to provide a good reproduction of the original signal. The period of time during which all channels are sampled once is called the office cycle. This period is divided into a number of contiguous time intervals called time slots, any one of which may be assigned to the exclusive use of a talking or signalling circuit. Such a telephone system is disclosed in an application Serial No. 364,258, filed June 26, 1953, of E. T. Burton, A. L. Robinson and E. L. Younker, to which reference may be made for a fuller description. In the specific telephone system described in that application the office cycle is of 62.5 microsecond duration and it is divided into ten time slots each of 6.25 microsecond duration. The present invention will therefore be described on the basis of a ten time slot office cycle.

The specific embodiment of this invention depicted in the drawing comprises a pair of tubes 10 and 11 arranged as a self-restoring multivibrator circuit. In the quiescent state, control grid 13 of tube 10 stands at cathode potential since a resistor 14 of high value is connected between the grid and plate voltage supply. Grid 15 of tube 11 is negative with respect to the cathode. Thus plate 17 of tube 10 carries normal plate current and plate 18 of tube 11 is cut off. For convenience we shall refer to relative potentials from the standpoint of signals. Therefore we may say that plate 17 stands negative while plate 18 is positive.

If a negative pulse 19 is applied to grid 13 the circuit trips, causing plate 17 to become positive and plate 18 negative. The coupling of grid 13 to plate 18 through a timing condenser 20 causes the grid 13 to swing far negative. The grid drifts back slowly as condenser 20 charges through resistor 14 until conduction in tube 10 starts. Under immediate control of tickling pulses, described further below, the circuit then restores abruptly. The coupling between plate 17 and grid 15, provided by capacitor 21 and resistor 22, serves to sharpen this response. This response of the tubes 10 and 11 is thus that of a self-restoring multivibrator circuit.

In accordance with one aspect of this invention control circuits are provided for assuring that the initiating negative pulse 19 applied to grid 13 always occurs in the same time slot in a repeated office cycle and that conduction changes between the tubes 10 and 11 only at the start and end of this time slot. In the specific embodiment of this invention the control conditions for operation of the multivibrator circuit are imposed by a control signal source 25 and a negative synchronizing pulse generator 26. The control signal source transmits a change of potential 28 which may be considered as advising the multivibrator circuit that it is to function to seize the time slot in which the control signal commences and to provide enabling pulses to other circuitry only during that time slot while providing a blanking or inhibiting voltage during all other time slots. The synchronizing pulse generator 26 transmits a continuous train of synchronizing pulses 29 which define the start of each time slot.

The signal 28 and pulses 29 are combined in an input switch which may be a negative "and" gate comprising diodes 30 and 31. Another control input to this "and" gate is provided, in accordance with an important aspect of this invention, from plate 17 of tube 10 which is connected to the "and" gate through a low-pass filter network 32 composed of resistors 33 and 34 and capacitor 35. It is apparent that the output of the "and" gate remains at a positive signal potential as long as any one of the inputs is positive. It swings negative, transmitting a negative initiating pulse 19, only during the occurrence of a synchronizing pulse 29 if the other two inputs are negative.

In the quiescent state plate 17 is negative. However, while the control signal source supplies a positive voltage to the input switch, the output of the switch remains positive. If at any time the control input becomes negative, indicating that the time slot in which the control signal first occurs is to be seized and scanned, the output of the input switch transmits a negative pulse 19 with the next following synchronizing pulse 29, which we shall consider as indicating the start of the second time slot. This pulse, reaching grid 13 through a capacitor 37, trips the multivibrator circuit and, as explained above, grid 13 is carried far negative and returns slowly as condenser 20 charges through resistor 14. Voltages at various points in the circuit during the repeated sequence are depicted in Fig. 2 to which reference may advantageously be made in connection with the present discussion.

In addition to the voltage from the condenser 20, the grid 13 is supplied with low amplitude positive synchronizing spikes 40 from a positive synchronizing pulse generator 41. The synchronizing spikes 40 are applied to the grid 13 through a diode 42 and a condenser 43. These spikes 40 are in step with the synchronizing pulses 29. They are low in amplitude and so are overridden by the negative synchronizing pulses 29 when present, but are effective when the input switch is disabled. These spikes 40 are of just sufficient amplitude to cause restore of the multivibrator to occur at the start of a time slot, defined by the presence of a synchronizing pulse, and never during a time slot. Therefore, the duration of the tripped period is always a whole number of time slots, the exact number being related to the values of condenser 20 and resistor 14. In the specific embodiment depicted wherein it has been assumed that the repeated office cycle comprises ten time slots, the duration of the tripped period is exactly nine time slots and the tripped period always ends at the start of the first or seized time slot.

Let us consider again the input switch. While the circuit is tripped, plate 17 is positive and this voltage is applied to the input switch to prevent response to the negative synchronizing pulses 29 through the period of nine time slots, from the second to the next occurrence of the first time slot. At the instant that the circuit restores to its original state, which is the start of the first or seized time slot, the voltage of plate 17 becomes negative. In accordance with an aspect of this invention this change of voltage on plate 17 is ineffective to enable the input switch for that time slot, but is effective to enable the gate for the start of the next time slot, which is the second time slot in the repeated office cycle. This is due to the presence of the low-pass filter network 32 which delays the effect of the change in the voltage of plate 17 until after the occurrence of the synchronizing pulse 29 denoting the commencement of the seized time slot, as seen in Fig. 2. The time constant of the low-pass filter network 32 is not critical, but must be such that the voltage on the output of the network, at the input switch, remains positive during the presence of the concurrent synchronizing pulse and has dropped to a sufficiently low value by the time of the occurrence of the next synchronizing pulse 29 that the input gate is enabled.

In order to prepare the circuit for response to an initiating pulse 19 one time slot following the restore it is necessary to quickly return the charge on condenser 20 to substantially that which existed during the quiescent state. This may advantageously be accomplished by a diode 45, a bypass capacitor 46 in parallel with the cathode resistance 47. At the instant of restore the potential difference between the terminals of condenser 20 is lower than that of the quiescent state by a major portion of the step voltage delivered from plate 18. This represents the change in condenser charge due to current through resistor 14 during the preceding tripped interval. Therefore, when plate 18 returns to positive potential, grid 13 is abruptly carried positive. The voltage step of grid 13 is arrested when diode 45 begins to conduct and the charge of condenser 20 is rapidly restored to its original value by the flow of current through diode 45 and capacitor 46. A resistor 48 is advantageously placed in series with condenser 20 to limit the current surge through condenser 20 which might otherwise be sufficient seriously to impair the substantially square voltage wave from plate 18. Resistor 48 is advantageously of a low value of resistance.

Once the input switch is enabled, the circuit continues to run, the output from plate 17 being positive for nine time slots and then negative for one time slot. The response of plate 18 is complementary to plate 17. The one time slot pulse always occurs only in the time in which the control input originally became negative at the start of the pulsing, which is the seized time slot. Either plate output may be employed to provide either enabling or blanking signals to subsequent circuitry, depending on whether it is desired to enable such circuitry on the occurrence of a positive or a negative pulse in the seized time slot. Further the output appearing on only one plate may be employed to provide both enabling and inhibiting signals or the output on one plate may provide enabling signals and that on the other inhibiting signals.

When the control voltage returns positive, the control grid 13 receives no further initiating pulses 19 and the pulsing ceases at the end of the office cycle then in progress. At that time the circuit is in its quiescent state and ready for the next order from the control signal source to seize a time slot and cycle in synchronism with it. It should be borne in mind that the time slot seized may be any time slot in the office cycle, being merely that time slot in which the control signal first becomes negative. Further the control signal potential 28 need only be negative at the end of the marked or seized time slot to assure operation of this circuit, though ordinarily the signal 28 steps negative and remains thus for the operating period, as described above.

In the specific embodiment depicted the input switch has two external control inputs applied to it, one from a control signal source 25 and another from the synchronous pulse generator 26. These may be combined in a gate distinct from the input switch and a signal transmittal through the gate when the multivibrator circuit is to be tripped. Similarly additional controls could be employed if desired, each such additional control being connected in the input switch or gate by a diode, an output pulse being received from the switch or gate only when all control pulses are negative, as above. These additional control pulses would also be at the same reference potential as the other pulses of the circuit which, in the specific embodiment depicted, is at plate level.

In one specific illustrative embodiment of the invention as depicted in Fig. 1 the various elements were given the following values, which are to be considered as merely exemplary and in no way restrictive:

| | | |
|---|---|---|
| Condensers: | | |
| **20** | $\mu\mu$f | 150 |
| **21** | $\mu\mu$f | 15 |
| **35** | $\mu\mu$f | 220 |
| **37** | $\mu\mu$f | 33 |
| **46** | $\mu$f | 0.01 |
| Resistors: | | |
| **14** | megohms | 3.3 |
| **22** | ohms | 15,000 |
| **33** | do | 22,000 |
| **34** | do | 15,000 |
| **47** | do | 4,700 |
| **48** | do | 10,000 |
| **49** | do | 100,000 |
| **50** | do | 3,000 |
| **51** | do | 270,000 |

Tubes 10 and 11 were the two halves of a Western Electric type 396A dual triode. The amplitude of the various voltage pulses throughout the circuit was 26 volts, as indicated on Fig. 2. This particular circuit operated on a cycle of ten time slots, each of 6.25 microsecond duration, but is not limited either to a cycle of any particular number of time slots or of any particular duration.

It is to be understood that the above-described arrangements are illustrative of the application of the principles of the invention. Numerous other arrangements may be devised by those skilled in the art without departing from the spirit and scope of the invention.

What is claimed is:

1. In combination, a pair of tubes having a plate, a cathode, and control grid electrode with certain electrodes of one tube connected to certain electrodes of the other tube so as to comprise a monostable multivibrator circuit, said multivibrator circuit having a first stable state wherein said one tube is conducting and said other tube is non-conducting and a second state wherein said other tube is conducting and said one tube is non-conducting, a timing capacitor connected between the plate electrode of said other tube and the grid electrode of said one tube, a source of synchronizing pulses, switch means connected between said pulse source and the grid electrode of said one tube for applying an initiating pulse to the grid electrode of said one tube to extinguish said one tube on occurrence of said synchronizing pulses, and means inhibiting said switch means when said one tube is non-conducting and for a predetermined period after said one tube becomes conducting, said inhibiting means comprising a feedback path from the plate electrode of said one tube to said switch means.

2. In combination, a pair of tubes having at least an anode, cathode, and grid electrode with certain electrodes of one tube connected to certain electrodes of the other tube so as to comprise a multivibrator circuit, said multivibrator circuit having a first stable state wherein said one tube is conducting and said other tube is non-conducting and a second state wherein said other tube is conducting said one tube is non-conducting, a timing capacitor connected between the plate electrode of said other tube and the grid electrode of said one tube, a source of synchronizing pulses, said pulses defining the commencing of time slots in a repeated cycle of *n* times slots where *n* designates the number of time slots in a repetitive cycle, switch means connected between said pulse source and the grid electrode of said one tube for applying an initiating pulse to the grid electrode of said one tube to extinguish said one tube on occurrence of a synchronizing pulse in a first time slot, and means inhibiting said switch means when said one tube is non-conducting and for a period less than one time slot thereafter, said inhibiting means comprising delay network means in a feedback path between the anode electrode of said one tube and said switch means.

3. In the combination of claim 2, means for restoring said timing capacitor in exactly $(n-1)$ time slots whereby said inhibiting means inhibits said switch means for a period greater than $(n-1)$ time slots but less than $n$ time slots and initiating pulses are applied to said grid electrode of said one tube by said switch means at the commencement of the first time slot in each repeated cycle.

4. In the combination of claim 3, said restoring means including a source of tickling pulses of an amplitude substantially less than that of said initiating pulses, of opposite polarity thereto, and in synchronism therewith and means applying said tickling pulses to said grid electrode of said one tube.

5. In the combination of claim 4, means for restoring the charge on said timing capacitor substantially to its quiescent state during the $(n-1)$st time slot comprising a diode poled for passage of the charge current therethrough and a bypass capacitor.

6. In combination, a pair of tubes having at least an anode, cathode, and grid electrode with certain electrodes of one tube connected to certain electrodes of the other tube so as to comprise a multivibrator circuit, said multivibrator circuit having a first stable state wherein said one tube is conducting and said other tube is non-conducting and a second state wherein said other tube is conducting and said one tube is non-conducting, a timing capacitor connected between the anode of said other tube and the grid electrode of said one tube, a plurality of control pulse sources, one of said sources transmitting a train of synchronizing pulses, switch means connected between said pulse sources and the grid electrode of said one tube applying an initiating pulse to the grid electrode of said one tube to extinguish conduction in said one tube only on coincidence of control pulses from all of said control pulse sources, and means inhibiting said switch means when said one tube is non-conducting and for a predetermined period after said one tube again becomes conducting, said inhibiting means comprising a feedback path from the anode electrode of said one tube to said switch means.

7. In combination, a pair of tubes having at least an anode, cathode, and control grid electrode with certain electrodes of one tube connected to certain electrodes of the other tube so as to comprise a multivibrator circuit, said multivibrator circuit having a first stable state wherein said one tube is conducting and said other tube is non-conducting and a second state wherein said other tube is conducting and said one tube is non-conducting, a timing capacitor connected between the anode electrode of said other tube and the control grid electrode of said one tube, a source of synchronizing pulses, a source of control pulses, switch means connected between said pulse sources and the grid electrode of said one tube for applying an initiating pulse to the control grid electrode of said one tube to extinguish conduction in said one tube only on the coincidence of a synchronizing and a control pulse, and means inhibiting said switch means when said one tube is non-conducting and for a predetermined period after said one tube again becomes conducting, said inhibiting means comprising a filter circuit connected between the anode electrode of said one tube and said means for applying said initiating pulse.

8. In combination, a pair of tubes having at least a plate, cathode, and grid electrode with certain electrodes of one tube connected to certain electrodes of the other tube so as to comprise a multivibrator circuit, said multivibrator circuit having a first stable state wherein one of said tubes is conducting and the other non-conducting and a second state wherein the other tube is conducting and the one tube non-conducting, a timing capacitor connected between the plate electrode of one tube and the grid electrode of the other, a source of synchronizing pulses, said pulses defining the commencement of time slots in a repeated cycle of $n$ time slots where $n$ designates the number of time slots in the repetitive cycle, switch means connected between said pulse source and one of said tubes for applying an initiating pulse to the grid electrode of one of said tubes to change said tubes from their first stable state to their second state, and means inhibiting said switch means when said tubes are in their second state and for a period less than one time slot thereafter, said inhibiting means comprising a feedback path between the plate electrode of one of said tubes and said switch means.

9. In the combination of claim 8, said inhibiting means further comprising a delay network means in said feedback path, and the combination further comprising means for restoring said timing capacitor in exactly $(n-1)$ time slots whereby said inhibiting means inhibits said switch means for a period greater than $(n-1)$ time slots but less than $n$ time slots and initiating pulses are applied to said grid electrode by said switch means at the commencement of the first time slot in each repeated cycle.

10. In combination, a pair of tubes having at least a plate, cathode, and grid electrode with certain electrodes of one tube connected to certain electrodes of the other tube so as to comprise a multivibrator circuit, said multivibrator circuit having a first stable state wherein one of said tubes is conducting and the other non-conducting and a second state wherein the other tube is conducting and the one tube non-conducting, a timing capacitor connected between the plate electrode of one tube and the grid electrode of the other tube, a source of synchronizing pulses, said pulses defining the commencement of time slots in a repeated cycle of $n$ time slots where $n$ designates the number of time slots in the repetitive cycle, switch means connecting said pulse source to one of said tubes for applying an initiating pulse to the grid electrode of one of said tubes to change said tubes from their first stable state to their second state on occurrence of a synchronizing pulse in a first time slot, means for restoring said timing capacitor in exactly $(n-1)$ time slots, said restoring means including a source of tickling pulses of an amplitude substantially less than that of said initiating pulses and in synchronism therewith and means applying said tickling pulses to said timing capacitor, and means for inhibiting said switch means during the period of $(n-1)$ time slots when said tubes are in their second state and for a period less than one time slot thereafter, said inhibiting means comprising a filter network in a feedback path between the plate electrode of one of said tubes and said switch means.

11. In the combination of claim 10, means for restoring the charge on said timing capacitor substantially to its quiescent state during the $(n-1)$st time slot comprising a diode poled for passage of the charge therethrough and a bypass capacitor.

References Cited in the file of this patent

UNITED STATES PATENTS

| | | |
|---|---|---|
| 2,390,608 | Miller | Dec. 11, 1945 |
| 2,461,871 | Bass | Feb. 15, 1949 |
| 2,633,535 | Daskam | Mar. 31, 1953 |
| 2,644,887 | Wolfe | July 7, 1953 |